United States Patent
Yaginuma et al.

(10) Patent No.: US 11,588,388 B2
(45) Date of Patent: Feb. 21, 2023

(54) POWER SUPPLY SYSTEM, CONTROL DEVICE, AND METHOD FOR MEASURING REACTOR CURRENT

(71) Applicant: TOYOTA JIDOSHA KABUSHIKI KAISHA, Toyota (JP)

(72) Inventors: Daiki Yaginuma, Toyota (JP); Masato Nonaka, Toyota (JP); Keidai Minami, Miyoshi (JP); Masaharu Kimura, Toyota (JP); Tomohiko Kaneko, Kanagawa-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/394,063

(22) Filed: Aug. 4, 2021

(65) Prior Publication Data

US 2022/0060107 A1 Feb. 24, 2022

(30) Foreign Application Priority Data

Aug. 24, 2020 (JP) .............................. JP2020-140960

(51) Int. Cl.
  *H02M 3/156* (2006.01)
  *H02M 1/00* (2006.01)
  *H02M 3/157* (2006.01)

(52) U.S. Cl.
  CPC ......... *H02M 1/0009* (2021.05); *H02M 3/156* (2013.01); *H02M 3/157* (2013.01)

(58) Field of Classification Search
  CPC .................................................. H02M 1/0009
  See application file for complete search history.

(56) References Cited

U.S. PATENT DOCUMENTS

| 9,035,624 B1* | 5/2015 | Rahimi | ................. | H02M 3/156 323/224 |
| 9,035,633 B1* | 5/2015 | Slavin | .................. | H02M 3/156 323/282 |
| 2007/0096706 A1* | 5/2007 | Terakado | ............. | H02M 3/156 323/282 |

(Continued)

FOREIGN PATENT DOCUMENTS

| JP | 2010022170 A | 1/2010 |
| JP | 2010279151 A | 12/2010 |
| JP | 2014158377 A | 8/2014 |

*Primary Examiner* — Alex Torres-Rivera
(74) *Attorney, Agent, or Firm* — Dickinson Wright, PLLC

(57) ABSTRACT

A control device of a power supply system includes a processor configured to set a sampling period, at which measurement values of a reactor current flowing through a reactor of a DC-DC converter and measured by an ammeter are sampled, so as to minimize a sum of differences between the length of a first period in a switching cycle of a switching element of the DC-DC converter and an integer multiple of the sampling period and between the length of a second period in the switching cycle and an integer multiple of the sampling period, the reactor current increasing during the first period and decreasing during the second period; sample, at intervals of the sampling period, measurement values of the reactor current measured by the ammeter; and average measurement values sampled in the switching cycle, thereby measuring an average of the reactor current in the switching cycle.

6 Claims, 7 Drawing Sheets

(56) References Cited

U.S. PATENT DOCUMENTS

| | | | |
|---|---|---|---|
| 2010/0007323 A1* | 1/2010 | Tsujii | H02M 3/156 323/312 |
| 2011/0050187 A1* | 3/2011 | Lai | H02M 3/1588 323/282 |
| 2012/0078556 A1* | 3/2012 | Holmberg | H02M 3/156 702/64 |

* cited by examiner

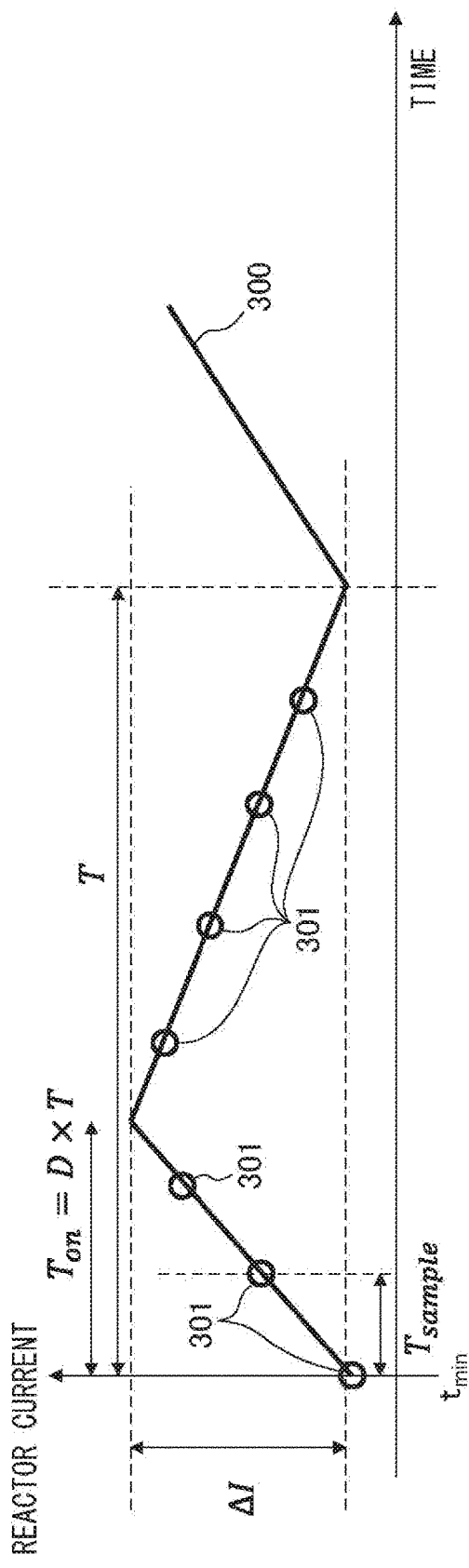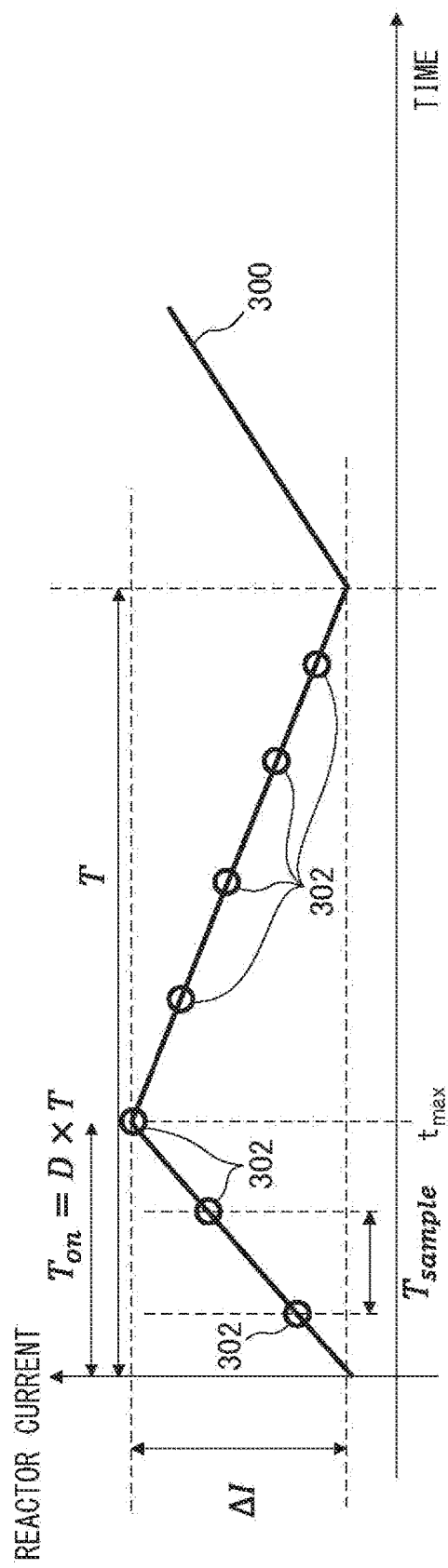

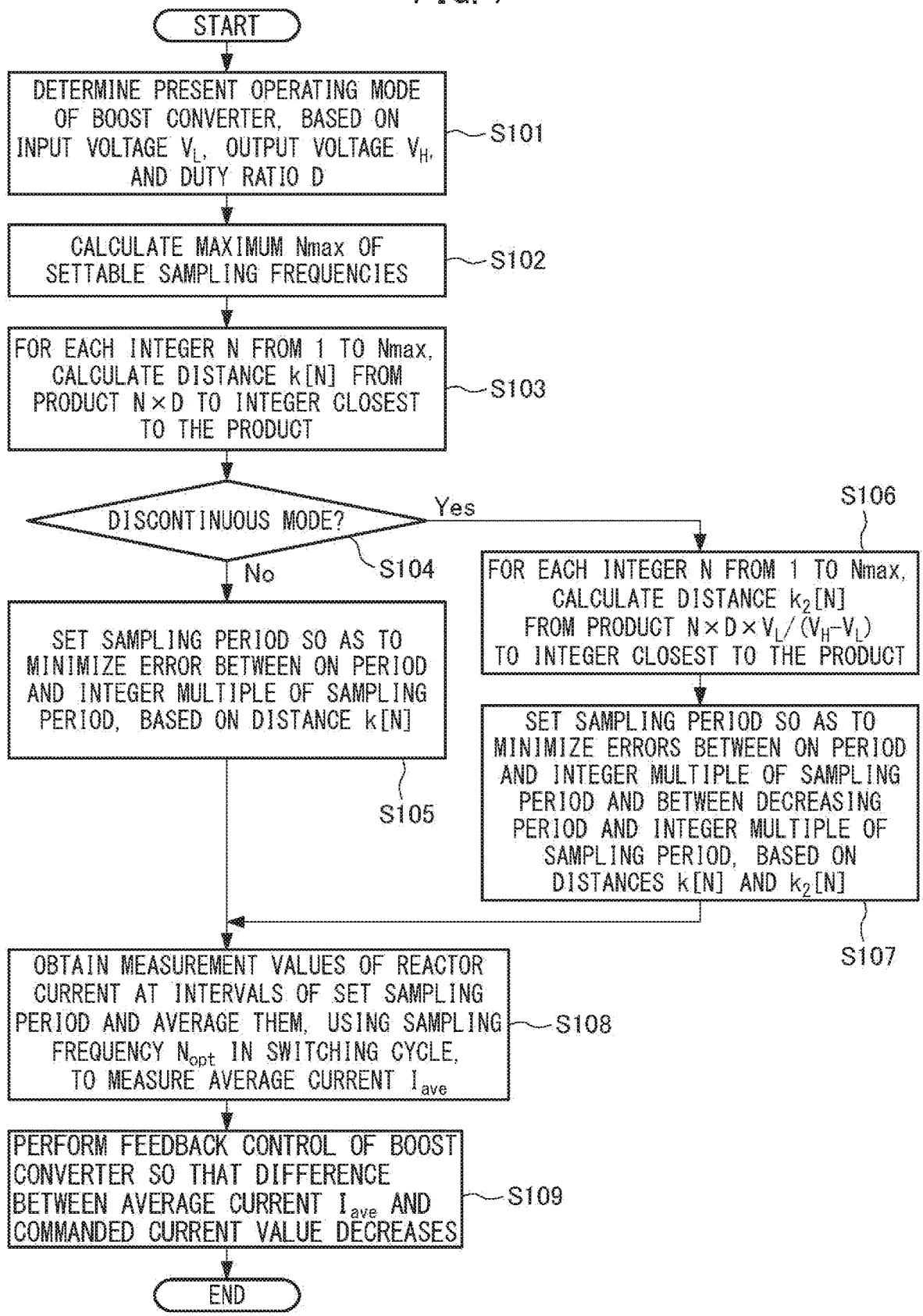

POWER SUPPLY SYSTEM, CONTROL DEVICE, AND METHOD FOR MEASURING REACTOR CURRENT

FIELD

The present invention relates to a power supply system including a DC-DC converter that transforms inputted direct-current power, a control device for controlling such a DC-DC converter, and a method for measuring a reactor current flowing through a reactor included in the DC-DC converter.

BACKGROUND

To boost direct-current power supplied from a direct-current power source, such as a fuel cell, a boost-type DC-DC converter (hereafter, a DC-DC converter will be simply referred to as a "converter") is used in some cases. Such a boost-type converter includes, for example, a reactor and a switching element. Control of a duty ratio, which is a ratio of the period during which the switching element is ON to a switching cycle of the switching element, leads to control of a current flowing through the reactor (hereafter simply a "reactor current"), which results in control of a transformation ratio (in this example, a boost ratio) of the voltage outputted from the converter to the voltage inputted thereinto. For this reason, appropriate control of the transformation ratio requires precise measurement of a reactor current. To this end, a technique has been proposed to measure a reactor current of a converter (see, e.g., Japanese Unexamined Patent Publication No. 2010-279151).

For example, a device for detecting an average reactor current described in Japanese Unexamined Patent Publication No. 2010-279151 determines whether a period during which the value of a reactor current nonlinearly changes exists in a cycle of switching control by a switching element. When such a period exists, the device estimates an average amount of the reactor current in a cycle of switching control, based on voltages inputted into and outputted from a voltage converter, a value of a reactor, and a ratio of an ON period to an OFF period of the switching element.

SUMMARY

The above-described technique improves reliability of measured averages of a reactor current in a cycle of switching control by a switching element of a boost converter. However, a technique to measure a reactor current of a boost converter more accurately is required.

It is an object of the present invention to provide a power supply system that can improve the accuracy of measurement of a reactor current of a DC-DC converter.

According to an aspect, a power supply system is provided. The power supply system includes a power source that supplies direct-current power; a DC-DC converter including a reactor connected to the power source and a switching element connected to one end of the reactor; and a control device that controls the DC-DC converter. The switching element is repeatedly turned on and off to control a reactor current flowing through the reactor, thereby transforming direct-current power supplied from the power source. The control device includes a processor configured to: set a sampling period, at which measurement values of the reactor current measured by an ammeter for measuring the reactor current are sampled, so as to minimize a sum of differences between the length of a first period in a switching cycle of turn-on and turn-off of the switching element and an integer multiple of the sampling period and between the length of a second period in the switching cycle and an integer multiple of the sampling period, the reactor current increasing during the first period and decreasing during the second period, sample, at intervals of the set sampling period, measurement values of the reactor current measured by the ammeter, and average measurement values of the reactor current sampled in the switching cycle, thereby measuring an average of the reactor current in the switching cycle.

In the power supply system, the processor of the control device preferably calculates, for each of sampling period candidates, a first distance from a product of a sampling frequency in the switching cycle corresponding to the candidate and a duty ratio to an integer closest to the product, determines, of the sampling period candidates, a candidate such that a difference between the length of the first period and an integer multiple of the candidate is the smallest, based on the first distance of each of the sampling period candidates, and sets the determined candidate as the sampling period, the duty ratio being a ratio of a period during which the switching element is ON to the switching cycle.

The power supply system preferably further includes a first voltmeter that measures an input voltage inputted into the DC-DC converter; and a second voltmeter that measures an output voltage outputted from the DC-DC converter. The processor of the control device preferably is further configured to determine whether operating mode of the DC-DC converter is discontinuous mode in which the reactor current does not flow for some period in the switching cycle or continuous mode in which the reactor current continually flows in the switching cycle, based on the input voltage, the output voltage, and the duty ratio. When the operating mode of the DC-DC converter is the discontinuous mode, the processor preferably further calculates, for each of the sampling period candidates, a second distance from a product of a sampling frequency in the switching cycle corresponding to the candidate and a ratio of the second period to the switching cycle to an integer closest to the product, determines, of the sampling period candidates, a candidate such that a sum of differences between the length of the first period and an integer multiple of the candidate and between the length of the second period and an integer multiple of the candidate is the smallest, based on the first distance and the second distance of each of the sampling period candidates, and sets the determined candidate as the sampling period.

In this case, when the operating mode of the DC-DC converter is the continuous mode, the processor preferably calculates a determination value for each of the sampling period candidates and sets, as the sampling period, of the sampling period candidates, a candidate such that the determination value is the smallest, the determination value for each of the sampling period candidates being a product divided by a square of a sampling frequency in the switching cycle corresponding to the candidate, the product being the first distance multiplied by the first distance subtracted from one.

Alternatively, when the operating mode of the DC-DC converter is the discontinuous mode, the processor preferably calculates a determination value for each of the sampling period candidates and sets, as the sampling period, of the sampling period candidates, a candidate such that the determination value is the smallest, the determination value for each of the sampling period candidates being a sum of products divided by a square of a sampling frequency in the switching cycle corresponding to the candidate, the products being the first distance multiplied by the first distance subtracted from one and the second distance multiplied by the second distance subtracted from one and by a coefficient depending on a ratio of the output voltage to the input voltage.

According to another aspect, a control device for controlling a DC-DC converter is provided. The DC-DC converter includes a reactor connected to a power source and a switching element connected to one end of the reactor. The switching element is repeatedly turned on and off to control a reactor current flowing through the reactor, thereby transforming direct-current power supplied from the power source. The control device includes a processor configured to: set a sampling period, at which measurement values of the reactor current flowing through the reactor and measured by an ammeter for measuring the reactor current are sampled, so as to minimize a sum of differences between the length of a first period in a switching cycle of turn-on and turn-off of the switching element and an integer multiple of the sampling period and between the length of a second period in the switching cycle and an integer multiple of the sampling period, the reactor current increasing during the first period and decreasing during the second period, sample, at intervals of the set sampling period, measurement values of the reactor current measured by the ammeter, and average measurement values of the reactor current sampled in the switching cycle, thereby measuring an average of the reactor current in the switching cycle.

According to still another aspect, a method for measuring a reactor current in a DC-DC converter including a reactor connected to a power source and a switching element connected to one end of the reactor is provided. The switching element is repeatedly turned on and off to control the reactor current flowing through the reactor, thereby transforming direct-current power supplied from the power source. The method includes setting a sampling period, at which measurement values of the reactor current flowing through the reactor and measured by an ammeter for measuring the reactor current are sampled, so as to minimize a sum of differences between the length of a first period in a switching cycle of turn-on and turn-off of the switching element and an integer multiple of the sampling period and between the length of a second period in the switching cycle and an integer multiple of the sampling period, the reactor current increasing during the first period and decreasing during the second period; sampling, at intervals of the set sampling period, measurement values of the reactor current measured by the ammeter; and averaging measurement values of the reactor current sampled in the switching cycle, thereby measuring an average of the reactor current in the switching cycle.

The power supply system according to the present invention has an advantageous effect of being able to improve the accuracy of measurement of a reactor current of a DC-DC converter.

BRIEF DESCRIPTION OF DRAWINGS

FIG. 3A illustrates an example of a measured average of a reactor current in a switching cycle for the case that an ON period in the switching cycle is not an integer multiple of a sampling period, as a comparative example.

FIG. 3B illustrates an example of a measured average of a reactor current in a switching cycle for the case that an ON period in the switching cycle is not an integer multiple of a sampling period, as a comparative example.

FIG. 7 is an operation flowchart of the DC-DC-converter control process according to the embodiment including the reactor-current measuring process.

DESCRIPTION OF EMBODIMENTS

Hereinafter, a power supply system that includes a converter, a control device that controls the converter, and a reactor-current measuring process to be executed in the power supply system will be described with reference to the drawings. The power supply system measures an average of a current flowing through a reactor (i.e., a reactor current) in a cycle of an ON state and an OFF state of a switching element included in the converter, i.e., in a switching cycle. To this end, the power supply system sets a sampling period, at which measurement values of the reactor current are sampled, so as to minimize the sum of differences between a period in the switching cycle during which the switching element is ON and an integer multiple of the sampling period and between a period in the switching cycle from the timing when the switching element changes from ON to OFF to when the reactor current becomes zero or a local minimum and an integer multiple of the sampling period. In this way, the power supply system reduces the error in a measured average of the reactor current in the switching cycle, regardless of timing when measurement values of the reactor current are sampled, with the purpose of improving the accuracy of measurement of an average of the reactor current. For convenience of description, a period during which the switching element is ON (i.e., a first period during which the reactor current increases) will be simply referred to as an "ON period," below. A period from the timing when the switching element changes from ON to OFF to when the reactor current becomes zero or a local minimum (i.e., a second period during which the reactor current decreases) will be simply referred to as a "decreasing period." Additionally, an average of the reactor current in the switching cycle will be simply referred to as an "average current."

The following describes a power supply system, a control device, and a reactor-current measuring process, assuming that a target converter for measuring a reactor current is a boost-type converter (hereafter simply a "boost converter"). However, the target converter for measuring a reactor current is not limited to a boost converter, and may be a buck-type converter (hereafter simply a "buck converter") or a converter that can step up and down a voltage (hereafter simply a "buck-boost converter").

Figure 1:
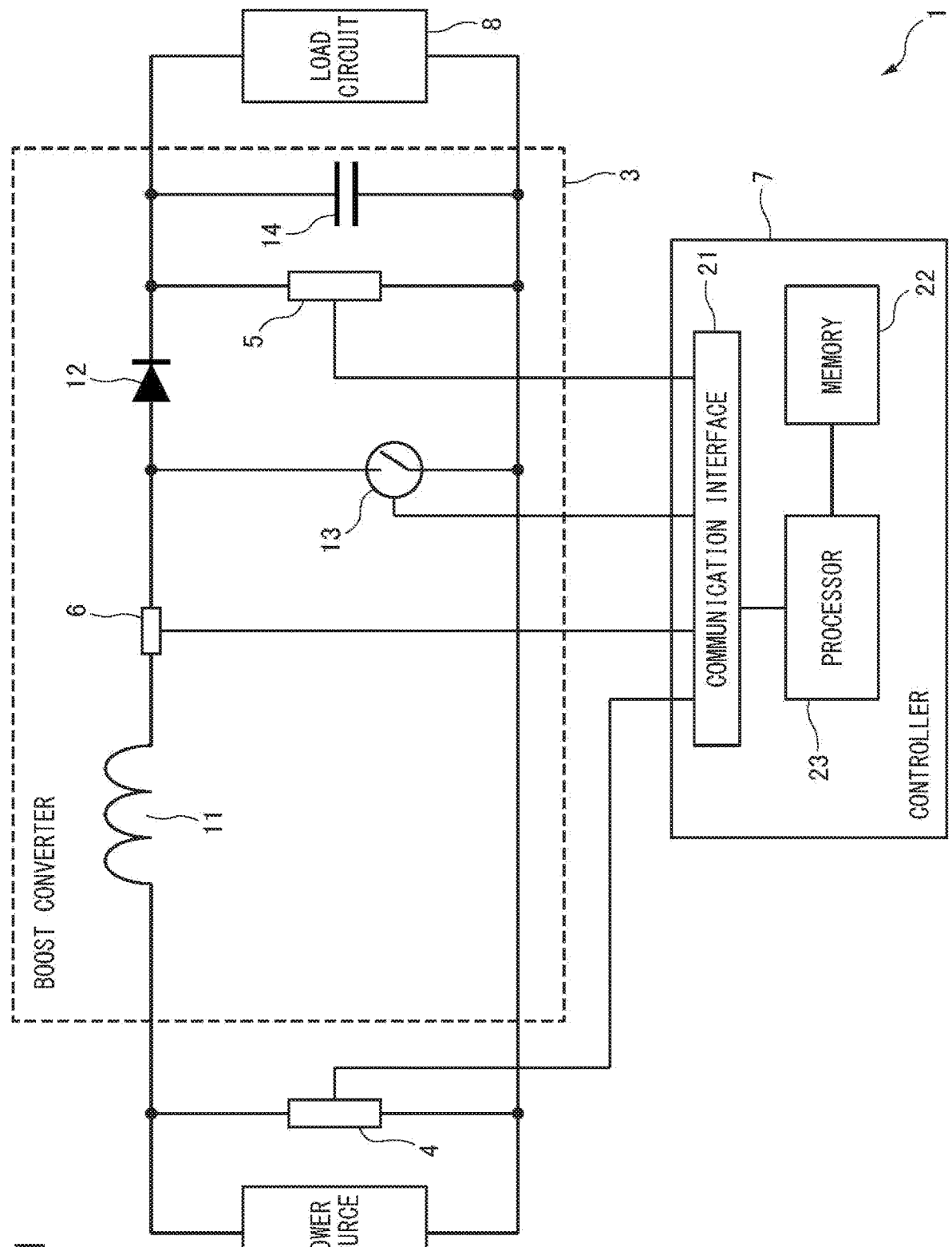
FIG. 1 schematically illustrates the configuration of a power supply system according to an embodiment.

FIG. 1 schematically illustrates the configuration of a power supply system according to an embodiment. As illustrated in FIG. 1, the power supply system 1 includes a power source 2, a boost converter 3, two voltmeters 4 and 5, an ammeter 6, and a controller 7. The power supply system 1 uses the boost converter 3 to boost direct-current power supplied from the power source 2, and supplies the boosted direct-current power to a load circuit 8. The power source 2 is connected with the single boost converter 3 in the example illustrated in FIG. 1, but may be connected with multiple boost converters in parallel. The controller 7 may control these boost converters. In this case, two voltmeters and one ammeter are connected to every boost converter, as illustrated in FIG. 1.

The power source 2 is a direct-current power source, and may be a fuel cell in the present embodiment. The power source 2 is not limited to a fuel cell, and may be a different type of direct-current power source, such as a lead storage battery or a lithium-ion battery. The direct-current power supplied from the power source 2 is inputted into the boost converter 3.

The boost converter 3 boosts the direct-current power supplied from the power source 2, and outputs the boosted direct-current power to the load circuit 8. To this end, the boost converter 3 includes a reactor 11, a diode 12, a switching element 13, and a smoothing capacitor 14.

The reactor 11 is connected between the power source 2 and the load circuit 8. The diode 12 is disposed between the reactor 11 and the smoothing capacitor 14 with the anode and cathode thereof connected to one end of the reactor 11 and to one end of the smoothing capacitor 14, respectively. In other words, the diode 12 is disposed so that a reactor current may flow from the reactor 11 toward the smoothing capacitor 14.

The switching element 13 may be, for example, a semiconductor switching element, such as a MOSFET or an insulated-gate bipolar transistor. The switching element 13 is connected to the one end of the reactor 11, which is opposite to the other end of the reactor 11 connected to the power source 2. More specifically, the switching element 13 is disposed, with one end thereof connected between the reactor 11 and the diode 12 and the other end thereof grounded, so as to switch between ON and OFF in accordance with a control signal from the controller 7. When the controller 7 turns on the switching element 13, energy is accumulated in the reactor 11 by a reactor current flowing through the reactor 11 via the switching element 13. When the controller 7 turns off the switching element 13, a reactor current caused by the energy accumulated in the reactor 11 flows to the smoothing capacitor 14.

The smoothing capacitor 14 smoothes electric power accumulated by the reactor current flowing from the reactor 11, and outputs it to the load circuit 8. Thus, periodic switching between ON and OFF of the switching element 13 performed by the controller 7 increases the electric power accumulated in the smoothing capacitor 14, causing the direct-current power supplied to the boost converter 3 to be boosted and then outputted therefrom.

The voltmeter 4, which is an example of the first voltmeter, is disposed between the power source 2 and the boost converter 3 and measures the voltage inputted into the boost converter 3 (hereafter simply the "input voltage"). The voltmeter 4 outputs a measurement value of the input voltage to the controller 7.

The voltmeter 5, which is an example of the second voltmeter, is disposed between the diode 12 and the smoothing capacitor 14 and measures the voltage outputted from the boost converter 3 (hereafter simply the "output voltage"). The voltmeter 5 may be disposed between the smoothing capacitor 14 and the load circuit 8. The voltmeter 5 outputs a measurement value of the output voltage to the controller 7.

The ammeter 6 is disposed between the reactor 11 and the diode 12 closer to the reactor 11 than the connection point of the switching element 13, and measures the reactor current flowing through the reactor 11. The ammeter 6 outputs a measurement value of the reactor current to the controller 7. The ammeter 6 may be disposed separately from the boost converter 3 or incorporated into the boost converter 3 as a component of the boost converter 3.

The controller 7 is an example of the control device, and controls the overall operation of the power supply system 1 including the boost converter 3. More specifically, the controller 7 determines a commanded current value for the boost converter 3, based on a target value of the electric power supplied from the power source 2 (hereafter simply a "target power value"), and sets a duty ratio, which is a ratio of the ON period of the switching element 13 to the switching cycle of the switching element 13, depending on the commanded current value. The target power value is received from another device, e.g., a controller of an apparatus into which the power supply system 1 is incorporated. The controller 7 then switches between ON and OFF of the switching element 13 at the set duty ratio every predetermined switching cycle. Additionally, the controller 7 measures an average current of the reactor of the boost converter 3, and modifies the duty ratio, depending on the measured average current.

To this end, the controller 7 includes a communication interface 21, a memory 22, and a processor 23. The communication interface 21, the memory 22, and the processor 23 may be separate circuits or a single integrated circuit.

The communication interface 21 includes an interface circuit for connecting the two voltmeters 4 and 5, the ammeter 6, and another device to the controller 7, and a gate driver for outputting a control signal to the switching element 13 of the boost converter 3. The communication interface 21 receives measurement values of the input voltage and the output voltage of the boost converter 3 from the voltmeters 4 and 5, respectively, and a measurement value of the reactor current from the ammeter 6, and passes these values to the processor 23. Additionally, the communication interface 21 outputs a control signal received from the processor 23 to the switching element 13 of the boost converter 3. The communication interface 21 also passes a target power value received from another device to the processor 23. Additionally, the communication interface 21 may receive information indicating an average of the reactor current in the switching cycle from the processor 23, and output it to another device.

The memory 22 is an example of a storage unit, and includes, for example, nonvolatile and volatile semiconductor memories. The memory 22 stores various types of information used for controlling the power supply system 1. For example, the memory 22 stores a table indicating a correspondence between commanded current values and duty ratios, and various types of information used for estimating an average current of the reactor of the boost converter 3. Additionally, the memory 22 temporarily stores various types of data calculated by the processor 23 while the power supply system 1 is operating.

The processor 23 includes, for example, one or more operating circuits and a peripheral circuit thereof. The processor 23 further includes a sampling circuit that can vary the sampling period. The processor 23 sets the duty ratio of the switching element 13 of the boost converter 3, and switches between ON and OFF of the switching element 13 at the set duty ratio every switching cycle. Additionally, the processor 23 measures an average current of the reactor of the boost converter 3 at predetermined intervals, and modifies the duty ratio, depending on the measured average current of the reactor.

Figure 2:
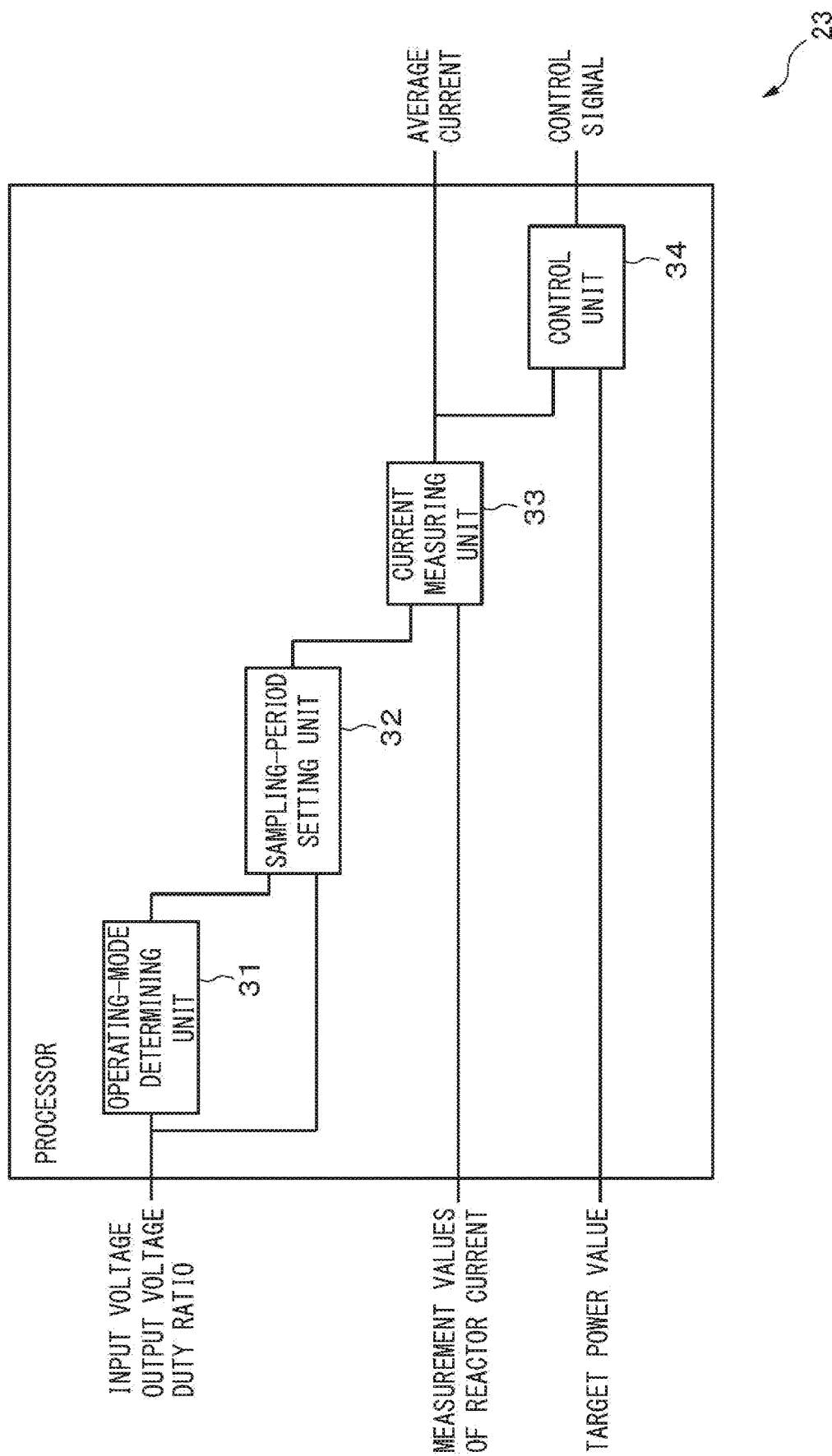
FIG. 2 is a functional block diagram of a processor of a controller, related to a DC-DC-converter control process including a reactor-current measuring process.

FIG. 2 is a functional block diagram of the processor 23, related to a converter control process including a reactor-current measuring process. The processor 23 includes an operating-mode determining unit 31, a sampling-period setting unit 32, a current measuring unit 33, and a control unit 34.

The operating-mode determining unit 31 determines the operating mode of the boost converter 3 at predetermined intervals (e.g., every switching cycle of the switching element 13 of the boost converter 3). In the present embodiment, the operating-mode determining unit 31 determines whether the operating mode of the boost converter 3 corresponds to discontinuous mode, in which the reactor current becomes zero in the switching cycle and does not flow for some period, or continuous mode, in which such a period does not exist (i.e., the reactor current continually flows), based on the input voltage, the output voltage, and the duty ratio.

In the present embodiment, due to the characteristics of the boost converter 3, when a mode determination value $\{D \times V_H/(V_H-V_L)\}$, which is obtained by multiplying the ratio of an output voltage $V_H$ to the difference $(V_H-V_L)$ between the output voltage $V_H$ and an input voltage $V_L$ by a duty ratio D, is not less than one, the reactor current does not become zero in the switching cycle, resulting in the operating mode of the boost converter 3 being continuous mode. When the mode determination value is less than one, the reactor current becomes zero for some period in the switching cycle, resulting in the operating mode of the boost converter 3 being discontinuous mode. Thus, the operating-mode determining unit 31 calculates the mode determination value from the input voltage $V_L$ of the boost converter 3 received from the voltmeter 4, the output voltage $V_H$ of the boost converter 3 received from the voltmeter 5, and the duty ratio D of the switching element 13, and determines whether the calculated mode determination value is less than one. When the mode determination value is less than one, the operating-mode determining unit 31 determines that the present operating mode of the boost converter 3 is discontinuous mode. When the mode determination value is not less than one, the operating-mode determining unit 31 determines that the present operating mode of the boost converter 3 is continuous mode.

In the case that a buck converter is included in the power supply system instead of the boost converter 3, the mode determination value is $\{D \times V_L/V_H\}$. When the mode determination value is not less than one, the operating mode of the buck converter is continuous mode; when the mode determination value is less than one, the operating mode of the buck converter is discontinuous mode. Similarly, in the case that a buck-boost converter is included in the power supply system instead of the boost converter 3, the mode determination value is $\{D \times (V_H+V_L)/V_H\}$. When the mode determination value is not less than one, the operating mode of the buck-boost converter is continuous mode; when the mode determination value is less than one, the operating mode of the buck-boost converter is discontinuous mode. Thus, in the case that a buck converter or a buck-boost converter is included in the power supply system, the operating-mode determining unit 31 calculates the mode determination value as in the embodiment, and determines the operating mode of the converter, based on whether the calculated mode determination value is less than one.

Every time the operating-mode determining unit 31 determines the operating mode of the boost converter 3, the operating-mode determining unit 31 notifies the sampling-period setting unit 32 of the determined operating mode.

The sampling-period setting unit 32 sets a sampling frequency and a sampling period at which the reactor current measured by the ammeter 6 in the switching cycle of the switching element 13 of the boost converter 3 are sampled. In the present embodiment, the sampling-period setting unit 32 sets the sampling period so as to minimize the sum of differences between the ON period and an integer multiple of the sampling period and between the decreasing period and an integer multiple of the sampling period, depending on the operating mode of the boost converter 3 notified from the operating-mode determining unit 31.

In the present embodiment, the sampling-period setting unit 32 sets the sampling period in accordance with the following steps.

(1) Calculate the maximum Nmax of sampling frequencies (hereafter, the "maximum sampling frequency") settable in a switching cycle T of the switching element 13 of the boost converter 3

(2) For each integer not greater than the maximum sampling frequency Nmax, i.e., each sampling frequency candidate N (N=1, 2, . . . , Nmax), calculate the distance k[N] between the product of the sampling frequency candidate N and the duty ratio D and an integer closest to this product (first distance)

(3) Depending on the operating mode of the boost converter 3, set a sampling frequency $N_{opt}$ such that the sum of differences between the ON period in the switching cycle and an integer multiple of the sampling period and between the decreasing period in the switching cycle and an integer multiple of the sampling period is the smallest, using the distance k[N] calculated for each sampling frequency candidate N, and set a sampling period $T_{sample}=T/N_{opt}$ Regarding step (1), the sampling-period setting unit 32 sets the maximum integer N satisfying the following inequality as the maximum sampling frequency Nmax.

$$T_{samplemin} < \frac{T}{N} \quad (1)$$

$T_{samplemin}$ is the minimum settable sampling period depending on the performance of the sampling circuit included in the processor 23. T is the switching cycle of the switching element 13 of the boost converter 3, as mentioned above. These values may be prestored, for example, in the memory 22.

For example, assume that the minimum settable sampling period $T_{samplemin}$ is 2 μs and that the switching cycle T is 50 μs. Then, the maximum sampling frequency Nmax is 50/2=25.

When the switching cycle is constant, the maximum sampling frequency Nmax is also a constant. In this case, the maximum sampling frequency Nmax may be prestored in the memory 22, and step (1) may be omitted.

Regarding step (2), for each sampling frequency candidate N (N=1, 2, . . . , Nmax) not greater than the maximum sampling frequency Nmax, the sampling-period setting unit 32 calculates the distance k[N] between the product of the sampling frequency candidate N and the duty ratio D and an integer closest to this product. The sampling-period setting unit 32 then stores the sampling frequency candidate N and the distance k[N] in the memory 22 in association with each other.

The following illustrates examples of the distance k[N] for the case that the duty ratio D is 38.1%. In the following examples, the distances k[N] for the case that the value of the sampling frequency candidate N is 15 to 25 are illustrated.

TABLE 1 examples of value of distance k[N] (duty ratio D = 38.1%)

| N | k[N] |
|---|---|
| 15 | 0.285 |
| 16 | 0.096 |
| 17 | 0.477 |
| 18 | 0.142 |
| 19 | 0.239 |
| 20 | 0.380 |
| 21 | 0.001 |
| 22 | 0.382 |
| 23 | 0.237 |
| 24 | 0.144 |
| 25 | 0.475 |

In the table, for example, when N=15, N×D=5.715 and thus the distance k[N] to the integer closest to N×D is 15.715−61=0.285. When N=21, N×D=8.001 and thus the distance k[N] to the integer closest to N×D is 18.001−81=0.001.

Regarding step (3), depending on the operating mode of the boost converter 3, the sampling-period setting unit 32 sets the sampling frequency $N_{opt}$ and the sampling period $T_{sample}$ so that the sum of differences between the ON period in the switching cycle and an integer multiple of the sampling period and between the decreasing period in the switching cycle and an integer multiple of the sampling period is the smallest, using the distance k[N] calculated for each sampling frequency candidate N.

When the operating mode of the boost converter 3 is continuous mode, the sampling-period setting unit 32 calculates a sampling frequency candidate N such that the following formula is the smallest, as the sampling frequency $N_{opt}$. The sampling-period setting unit 32 then sets the sampling period $T_{sample}$ to $T/N_{opt}$.

$$\frac{k[N](1-k[N])}{N^2} \quad (2)$$

In the following, it is explained that the sampling frequency candidate N minimizing the value of formula (2) minimizes the sum of differences between the ON period in the switching cycle and an integer multiple of the sampling period and between the decreasing period in the switching cycle and an integer multiple of the sampling period, and that the error in an average current of the reactor 11 is minimized when this sum is minimized.

FIGS. 3A and 3B illustrate examples of a measured average of the reactor current in the switching cycle for the case that the ON period in the switching cycle is not an integer multiple of the sampling period, as comparative examples. In FIGS. 3A and 3B, the abscissa represents time, and the ordinate represents the magnitude of the reactor current. Waveform 300 represents time-varying changes of the reactor current for the case that the boost converter 3 operates in continuous mode. In the examples illustrated in FIGS. 3A and 3B, the ON period $T_{on}$ (=T×D) in the switching cycle is 2.5 times as long as the sampling period $T_{sample}$. When the boost converter 3 operates in continuous mode, the difference between the switching cycle and the ON period is the decreasing period; hence, when the ON period is not an integer multiple of the sampling period, neither is the decreasing period.

In the example illustrated in FIG. 3A, the sampling period is set with respect to timing $t_{min}$ when the reactor current becomes a local minimum. Hence one of sampling points 301 is set at the timing $t_{min}$ when the reactor current becomes a local minimum. Hence the average $I_{measure}$ of measurement values of the reactor current at the sampling points 301 is less than the actual average current $I_{ave}$ of the reactor in the switching cycle. This is obvious from the following equation indicating the relationship between the average $I_{measure}$ of measurement values of the reactor current at the sampling points 301 and the actual average current $I_{ave}$ of the reactor in the switching cycle.

$$I_{measure} = I_{ave} - \frac{0.5 \times (1-0.5)}{N^2 D(1-D)} \times \frac{\Delta I}{2} \quad (3)$$

ΔI denotes the difference between a local maximum and a local minimum of the reactor current. Since the second term of the right side of equation (3) is constantly negative, the average $I_{measure}$ of measurement values of the reactor current is less than the actual average current $I_{ave}$ of the reactor in the switching cycle in this example.

In the example illustrated in FIG. 3B, the sampling period is set with respect to timing $t_{max}$ when the reactor current becomes a local maximum. Hence one of sampling points 302 is set at the timing $t_{max}$ when the reactor current becomes a local maximum. Hence the average $I_{measure}$ of measurement values of the reactor current at the sampling points 302 is greater than the actual average current $I_{ave}$ of the reactor in the switching cycle. This is obvious from the following equation indicating the relationship between the average $I_{measure}$ of measurement values of the reactor current at the sampling points 302 and the actual average current $I_{ave}$ of the reactor in the switching cycle.

$$I_{measure} = I_{ave} + \frac{0.5 \times (1-0.5)}{N^2 D(1-D)} \times \frac{\Delta I}{2} \quad (4)$$

Since the second term of the right side of equation (4) is constantly positive, the average $I_{measure}$ of measurement values of the reactor current is greater than the actual average current $I_{ave}$ of the reactor in the switching cycle in this example. Thus, when the ON period is not an integer multiple of the sampling period, there is an error between the average $I_{measure}$ of measurement values of the reactor current and the actual average current $I_{ave}$ of the reactor in the switching cycle, depending on timing when sampling points are set.

Figure 4:
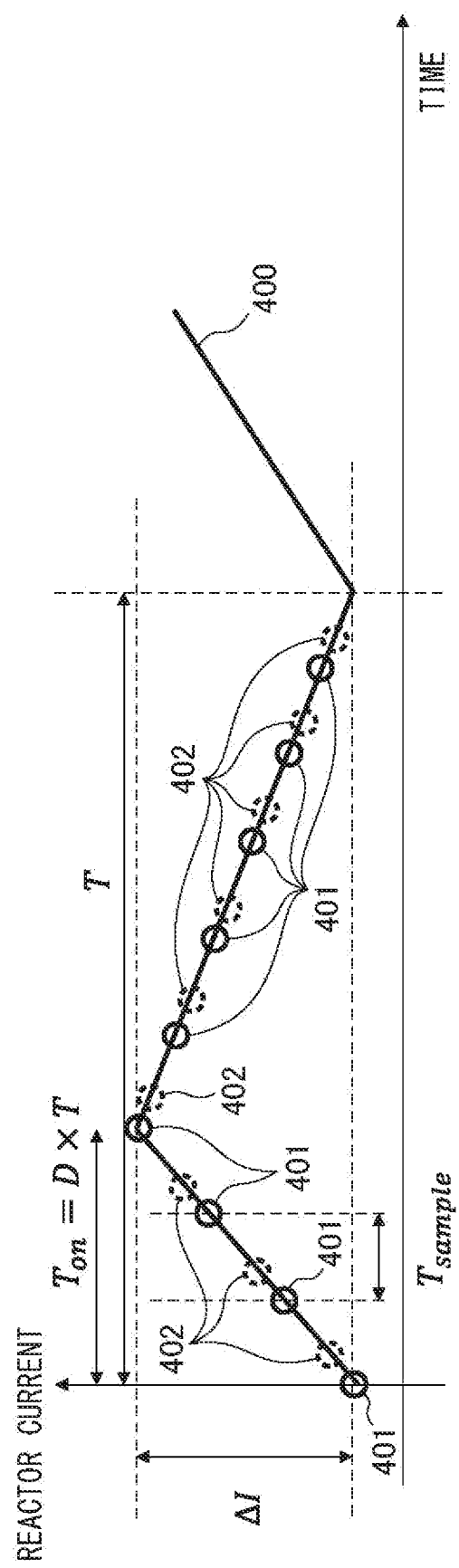
FIG. 4 illustrates an example of a measured average of a reactor current in a switching cycle for the case that an ON period in the switching cycle is an integer multiple of a sampling period.

FIG. 4 illustrates an example of a measured average of the reactor current in the switching cycle for the case that the ON period in the switching cycle is an integer multiple of the sampling period. In FIG. 4, the abscissa represents time, and the ordinate represents the magnitude of the reactor current. A waveform 400 represents time-varying changes of the reactor current for the case that the boost converter 3 operates in continuous mode. When the ON period $T_{on}$ (=D×T) is an integer multiple of the sampling period $T_{sample}$, the average $I_{measure}$ of measurement values of the reactor current at sampling points equals the actual average current $I_{ave}$ of the reactor in the switching cycle, regardless of timing of the sampling points. In this case, setting sampling points is not limited to the case in which one of the sampling points 401 is set at timing when the reactor current becomes a local maximum or a local minimum, but sampling points 402 may be set at timing delayed relative to the sampling points 401 by a predetermined time. This is because deviations of the values of the reactor current caused by deviations of timing of sampling points cancel out between the period of increase in the reactor current and the period of decrease in the reactor current.

As described above, when the ON period is an integer multiple of the sampling period, the average current of the reactor in the switching cycle is correctly measured by averaging measurement values of the reactor current at sampling points, regardless of timing of the sampling points. Thus, the sampling-period setting unit 32 sets the sampling period so as to minimize the difference between the ON period and an integer multiple of the sampling period. When the boost converter 3 operates in continuous mode, the length of the decreasing period equals the difference between the lengths of the switching cycle and the ON period; hence, minimization of the difference between the ON period and an integer multiple of the sampling period results in minimization of the difference between the decreasing period and an integer multiple of the sampling period. Additionally, the sampling-period setting unit 32 preferably sets the sampling period so that the sampling period will be as short as possible in addition to the difference being minimized, as indicated by formula (2).

Figure 5:
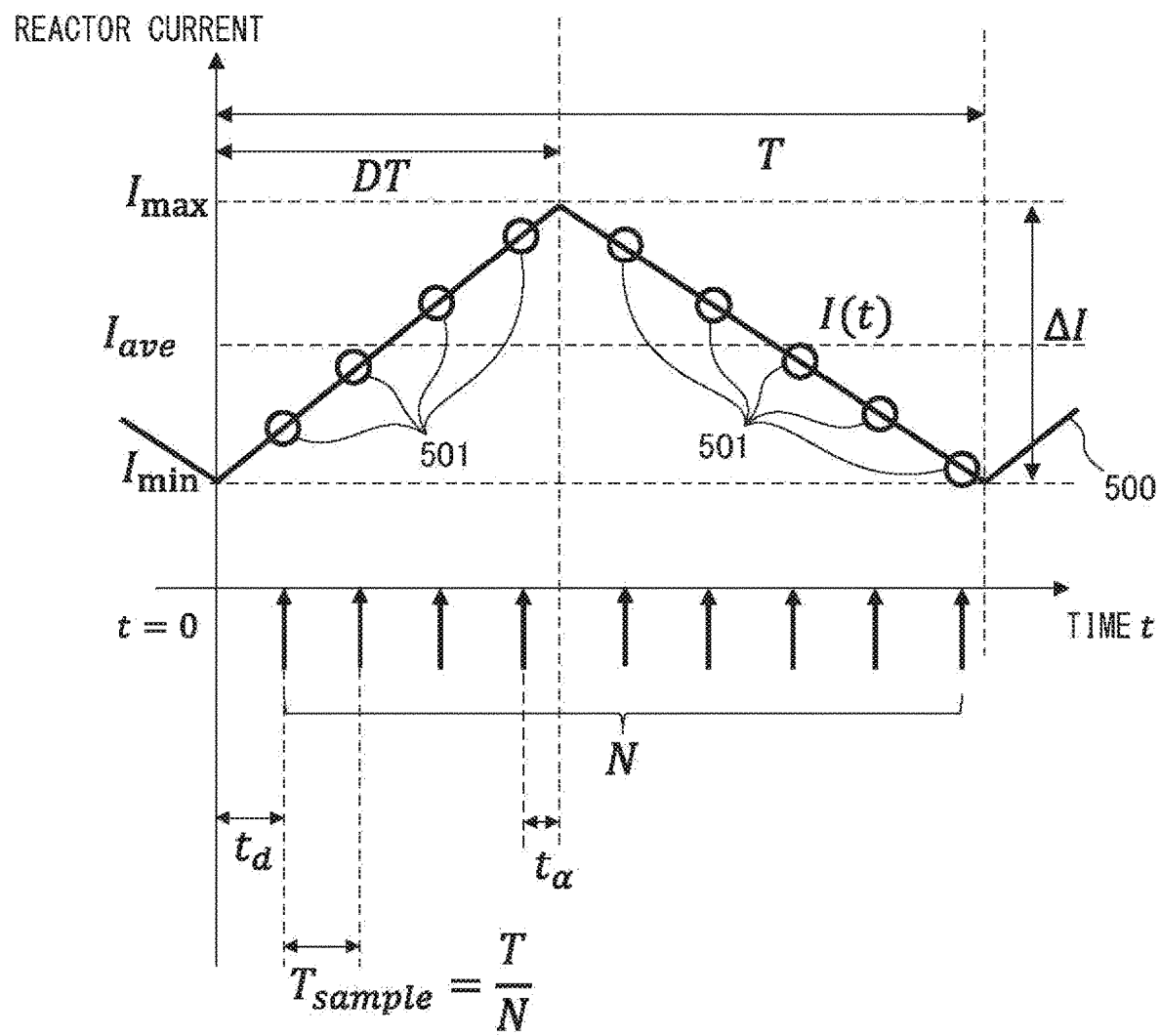
FIG. 5 is a diagram for briefly explaining setting of the sampling period for the case that a boost converter operates in continuous mode.

FIG. 5 is a diagram for briefly explaining setting of the sampling period for the case that the boost converter 3 operates in continuous mode. In FIG. 5, the abscissa represents time, and the ordinate represents the reactor current. A waveform 500 represents time-varying changes of the reactor current. As illustrated in FIG. 5, assume that a number, N, of sampling points 501 are set in the switching cycle T (i.e., the sampling period is T/N). Additionally, let to denote a delay time from the timing when the reactor current becomes a local minimum to the first sampling point, $t_\alpha$, denote the time difference from the timing when the reactor current becomes a local maximum to the sampling point previous thereto, and $\Delta I$ denote the difference between the local maximum and the local minimum of the reactor current. In this case, the average $I_{measure}$ of measurement values of the reactor current at the sampling points 501 in the switching cycle T is expressed by the following equation.

$$I_{measure} = \frac{1}{N}\left[I(t_d) + I\left(t_d + \frac{T}{N}\right) + I\left(t_d + \frac{T}{N}\right) + \ldots + I\left(t_d + \frac{(N-1)T}{N}\right)\right] = I_{ave} + \frac{\frac{Nt_d}{T}\left(1 - \frac{Nt_d}{T}\right) - \frac{Nt_\alpha}{T}\left(1 - \frac{Nt_\alpha}{T}\right)}{N^2 D(1-D)} \frac{\Delta I}{2} \quad (5)$$

I(t) denotes a measurement value of the reactor current at a sampling point t, and $I_{ave}$ denotes the actual average current of the reactor in the switching cycle.

As is obvious from the waveform 500 illustrated in FIG. 5, when the product of the sampling frequency candidate N in the switching cycle T and the duty ratio D is an integer, $(t_d+t_\alpha)N/T$ is 1. Hence the fractional part of $(t_d+t_\alpha)N/T$ and that of N×D are equal. Thus, the following equation is obtained by substituting the distance k[N] for the time difference $t_\alpha$ in equation (5) and setting the delay time $t_d$ so as to maximize the error between the average $I_{measure}$ of measurement values of the reactor current at the sampling points 501 and the actual average current $I_{ave}$ of the reactor in the switching cycle.

$$I_{measure} = I_{ave} \pm \frac{k[N](1 - k[N])}{N^2} \frac{1}{D(1-D)} \frac{\Delta I}{2} \quad (6)$$

Thus, it can be seen that the smaller the absolute value of the second term of the right side of equation (6), the smaller the error between the average $I_{measure}$ of measurement values of the reactor current at the sampling points 501 and the actual average current $I_{ave}$ of the reactor in the switching cycle, and that a requirement for minimizing the absolute value of the second term of equation (6) is to minimize formula (2).

Thus, the sampling-period setting unit 32 calculates a sampling frequency candidate N such that formula (2) is minimized, as the sampling frequency $N_{opt}$, and sets the sampling period to $T/N_{opt}$. Since the range of the distance k[N] is 0 to 0.5 by definition of the distance k[N], formula (2) is minimized when the distance k[N] is the smallest. When the distance k[N] is the smallest, the difference between the ON period in the switching cycle and an integer multiple of the sampling period is minimized, and the difference between the decreasing period and an integer multiple of the sampling period is also minimized, as described above. Additionally, the shorter the sampling period, the smaller the value of formula (2). However, when the distance k[N] is zero, i.e., when the difference between the ON period and an integer multiple of the sampling period is zero, formula (2) is zero. For this reason, when there are multiple sampling period candidates such that the difference between the ON period and an integer multiple of the sampling period is zero, the sampling-period setting unit 32 may set any of these candidates as the sampling period.

The following describes setting of the sampling period for the case that the operating mode of the boost converter 3 is discontinuous mode. When the operating mode of the boost converter 3 is discontinuous mode, the sampling-period setting unit 32 calculates a sampling frequency candidate N such that the following formula is the smallest, as the sampling frequency $N_{opt}$.

$$\frac{k[N](1 - k[N]) + \left(\frac{V_H}{V_L} - 1\right)k_2[N](1 - k_2[N])}{N^2} \quad \text{(boost-type)} \quad (7)$$

$k_2[N]$ denotes the distance between a product $\{N \times D \times V_L/(V_H-V_L)\}$ and an integer closest to this product (second distance). The factor $\{D \times V_L/(V_H-V_L)\}$ in this product represents the ratio of the length of the decreasing period to the switching cycle T. The length of the decreasing period is derived from an equilibrium condition of the inductor of the reactor 11 included in the boost converter 3. Thus, $k_2[N]$ represents the difference between the decreasing period and an integer multiple of the sampling period for the case that the sampling frequency in the switching cycle is N. This suggests that requirements for minimizing formula (7) are to minimize the sum of differences between the ON period and an integer multiple of the sampling period and between the decreasing period and an integer multiple of the sampling period and to make the sampling period as short as possible.

When a buck converter or a buck-boost converter is used instead of the boost converter 3, the sampling-period setting unit 32 calculates a sampling frequency candidate N such that the following formula is the smallest, as the sampling frequency $N_{opt}$.

$$\frac{k[N](1-k[N]) + \left(\frac{V_H}{V_L - V_H}\right)k_2[N](1-k_2[N])}{N^2} \quad \text{(buck-type)} \quad (7\text{-}1)$$

$$\frac{k[N](1-k[N]) + \left(\frac{V_H}{V_L}\right)k_2[N](1-k_2[N])}{N^2} \quad \text{(buck-boost-type)} \quad (7\text{-}2)$$

When a buck converter is used, $k_2[N]$ denotes the distance between a product $\{N \times D \times (V_L - V_H)/V_H\}$ and an integer closest to this product (second distance). The factor $\{D \times (V_L - V_H)/V_H\}$ represents the ratio of the length of the decreasing period to the switching cycle T. When a buck-boost converter is used, $k_2[N]$ denotes the distance between a product $\{N \times D \times V_L/V_H\}$ and an integer closest to this product (second distance). The factor $\{D \times V_L/V_H\}$ represents the ratio of the length of the decreasing period to the switching cycle T.

Alternatively, the sampling-period setting unit 32 may calculate a sampling frequency candidate N such that the following formula is the smallest, as the sampling frequency $N_{opt}$.

$$\frac{k[N](1-k[N]) + 0.25(r-1)}{N^2} \quad \text{(boost-type)} \quad (8)$$

The coefficient r is a target boost ratio ($V_H/V_L$) of the boost converter 3, and is set, for example, to one.

When a buck converter or a buck-boost converter is used instead of the boost converter 3, the sampling-period setting unit 32 may calculate a sampling frequency candidate N such that the following formula is the smallest, as the sampling frequency $N_{opt}$.

$$\frac{k[N](1-k[N]) + 0.25\left(\frac{r}{1-r}\right)}{N^2} \quad \text{(buck-type)} \quad (8\text{-}1)$$

$$\frac{k[N](1-k[N]) + 0.25r}{N^2} \quad \text{(buck-boost-type)} \quad (8\text{-}2)$$

The sampling-period setting unit 32 sets the sampling period $T_{sample}$ (=$T/N_{opt}$), based on the sampling frequency $N_{opt}$ calculated in accordance with formula (7) or (8). When a buck converter is used instead of the boost converter 3, the sampling-period setting unit 32 sets the sampling period $T_{sample}$ (=$T/N_{opt}$), based on the sampling frequency $N_{opt}$ calculated in accordance with formula (7-1) or (8-1). When a buck-boost converter is used instead of the boost converter 3, the sampling-period setting unit 32 sets the sampling period $T_{sample}$ (=$T/N_{opt}$), based on the sampling frequency $N_{opt}$ calculated in accordance with formula (7-2) or (8-2).

Figure 6:
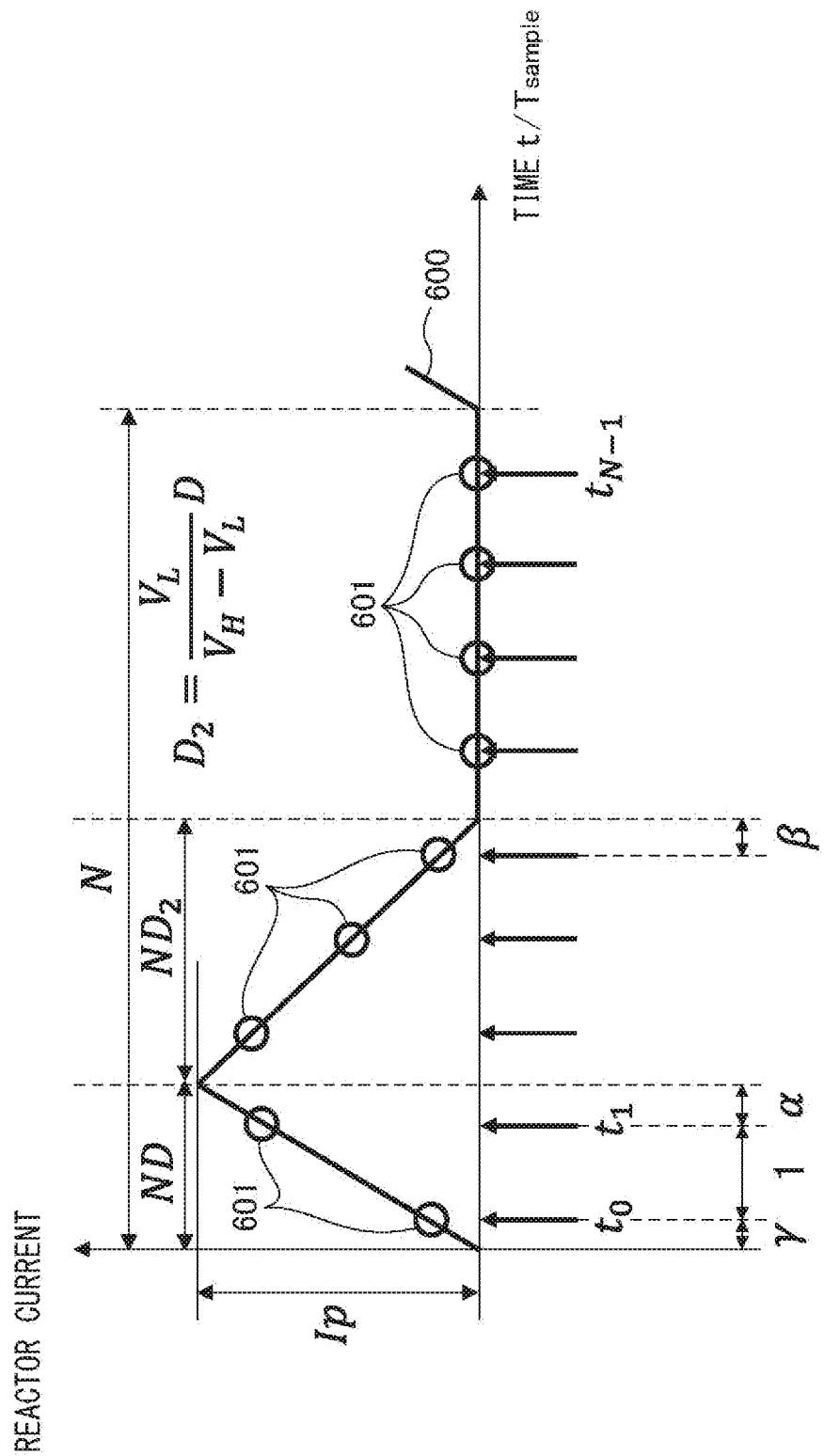
FIG. 6 is a diagram for briefly explaining setting of the sampling period for the case that a boost converter operates in discontinuous mode.

FIG. 6 is a diagram for briefly explaining setting of the sampling period for the case that the boost converter 3 operates in discontinuous mode. In FIG. 6, the abscissa represents time normalized using the sampling period, and the ordinate represents the reactor current. A waveform 600 represents time-varying changes of the reactor current. As illustrated in FIG. 6, assume that a number, N, of sampling points 601 are set in the switching cycle T (i.e., the sampling period is T/N). Additionally, let $\gamma$ denote a delay time from the timing when the reactor current is a local minimum to the first sampling point, $\alpha$ denote the time difference from the timing when the reactor current becomes a local maximum to the sampling point previous thereto, and $\beta$ denote the time difference from the timing when the reactor current becomes zero to the sampling point previous thereto. These delay time and time differences are normalized using the sampling period. Further, let Ip denote the difference between the local maximum and the local minimum of the reactor current. Further, $\alpha$ and $\beta$ are substituted with k, $k_2$, and $\gamma$, based on the relationship between $\alpha$, $\beta$, and $\gamma$, and $\gamma$ is set so as to maximize the error of $I_{measure}$. Then, the average $I_{measure}$ of measurement values of the reactor current at the sampling points 601 in the switching cycle T is expressed by the following equation.

$$I_{measure} = \frac{1}{N}[I(t_0) + I(t_1) + I(t_2) + \ldots + I(t_{N-1})] = \quad (9)$$

$$\frac{I_p}{2}(D + D_2) + \frac{I_p}{2DN^2}\left\{k[N](1-k[N]) + \frac{D}{D_2}k_2[N](1-k_2[N])\right\} =$$

$$\frac{I_p}{2}(D + D_2) + \frac{I_p}{2D}\frac{1}{N^2}\left\{k[N](1-k[N]) + \left(\frac{V_H}{V_L} - 1\right)k - 2[N](1-k_2[N])\right\}$$

$I(t_i)$ (i=0, 1, . . . , N−1) denotes a measurement value of the reactor current at a sampling point and $D_2$ is $D \times V_L/(V_H - V_L)$. When a buck converter is used instead of the boost converter 3, a factor $\{V_H/(V_L - V_H)\}$ is used in equation (9) instead of the factor $\{(V_H/V_L)-1\}$. Similarly, when a buck-boost converter is used instead of the boost converter 3, a factor $\{V_H/V_L\}$ is used in equation (9) instead of the factor $\{(V_H/V_L)-1\}$.

As is obvious from equation (9), the first term of the right side is the actual average of the reactor current in the ON period and the decreasing period. Thus, it can be seen that the smaller the absolute value of the second term of the right side of equation (9), the smaller the error between the average $I_{measure}$ of measurement values of the reactor current at the sampling points 601 and the actual average current of the reactor in the switching cycle, and that a requirement for minimizing the absolute value of the second term of equation (9) is to minimize formula (7). When the accuracy of measurement of the input voltage $V_L$ and the output voltage $V_H$ of the boost converter 3 is insufficient for setting the sampling period, formula (8) is obtained by assuming that $k_2[N]=0.5$ and $V_H/V_L=r$ in formula (7). Thus, the sampling-period setting unit 32 may set the sampling frequency $N_{opt}$ so as to minimize formula (8).

The sampling-period setting unit 32 notifies the current measuring unit 33 of the set sampling frequency $N_{opt}$ and sampling period $T_{sample}$.

The current measuring unit 33 obtains measurement values of the reactor current measured by the ammeter 6 at intervals of the sampling period $T_{sample}$ received from the sampling-period setting unit 32, via the sampling circuit. The current measuring unit 33 then averages a number, $N_{opt}$, of measurement values of the reactor current in the switching cycle, using the sampling frequency $N_{opt}$, to measure the average current $I_{ave}$ of the reactor in the switching cycle. The current measuring unit 33 notifies the control unit 34 of the measured average current of the reactor.

The control unit 34 controls the boost converter 3, based on the average current $I_{ave}$ of the reactor in the switching cycle received from the current measuring unit 33. For example, the control unit 34 divides a target power value, which is received from another device by the controller 7, by the voltage outputted from the power source 2, i.e., the voltage inputted into the boost converter 3 to calculate a commanded current value. The control unit 34 then determines the duty ratio corresponding to the commanded current value by referring to the table, which is prestored in the memory 22, indicating a correspondence between commanded current values and duty ratios of the switching element 13 of the boost converter 3. The control unit 34 outputs a control signal to the switching element 13 of the boost converter 3 so that the switching element 13 may switch between ON and OFF at the determined duty ratio every switching cycle, thereby controlling the boost converter 3. The control unit 34 may set a target boost ratio, based on the target power value and the voltage inputted into the boost converter 3.

The control unit 34 modifies the duty ratio so that the difference between the average current $I_{ave}$ of the reactor in the switching cycle received from the current measuring unit 33 and the commanded current value may decrease, thereby performing feedback control of the boost converter 3. To this end, the control unit 34 may modify the duty ratio in accordance with, for example, proportional control, proportional-plus-integral control, or PID control.

FIG. 7 is an operation flowchart of the converter control process according to the present embodiment including the reactor-current measuring process. The processor 23 may execute the converter control process in accordance with the following operation flowchart at predetermined intervals. Of the steps in the following operation flowchart, the process of steps S101 to S108 is included in the reactor-current measuring process.

The operating-mode determining unit 31 of the processor 23 determines the present operating mode of the boost converter 3, based on the input voltage $V_L$ of the boost converter 3 measured by the voltmeter 4, the output voltage $V_H$ of the boost converter 3 measured by the voltmeter 5, and the duty ratio D applied to the switching element 13 of the boost converter 3 (step S101).

The sampling-period setting unit 32 of the processor 23 calculates the maximum Nmax of sampling frequencies settable in the switching cycle of the switching element 13 (step S102). For each integer N from one to the maximum Nmax of settable sampling frequencies (i.e., each sampling frequency candidate corresponding to a sampling period candidate), the sampling-period setting unit 32 calculates the distance k[N] between the product of the integer N and the duty ratio D and an integer closest to this product (step S103).

The sampling-period setting unit 32 determines whether the present operating mode of the boost converter 3 received from the operating-mode determining unit 31 is discontinuous mode (step S104).

When the present operating mode of the boost converter 3 is continuous mode (No in Step S104), the sampling-period setting unit 32 sets the sampling frequency $N_{opt}$ and the sampling period $T_{sample}$ in the switching cycle T so as to minimize a difference between the ON period during which the switching element 13 is ON and an integer multiple of the sampling period, based on the distance k[N] of each sampling frequency candidate N from one to Nmax (step S105).

When the present operating mode of the boost converter 3 is discontinuous mode (Yes in Step S104), the sampling-period setting unit 32 calculates, for each sampling frequency candidate N from one to the maximum Nmax of settable sampling frequencies, the distance $k_2$[N] between the product of the candidate N and $D \times V_L/(V_H - V_L)$ and an integer closest to this product (step S106). As described above, when a buck converter is used instead of the boost converter 3, the sampling-period setting unit 32 calculates the distance between the product of the candidate N and $D \times (V_L - V_H)/V_H$ and an integer closest to this product, as the distance $k_2$[N]. When a buck-boost converter is used instead of the boost converter 3, the sampling-period setting unit 32 calculates the distance between the product of the candidate N and $D \times V_L/V_H$ and an integer closest to this product, as the distance $k_2$[N]. Then, the sampling-period setting unit 32 sets the sampling frequency $N_{opt}$ and the sampling period $T_{sample}$ in the switching cycle T so as to minimize the sum of differences between the ON period and an integer multiple of the sampling period and between the decreasing period and an integer multiple of the sampling period, based on the distances k[N] and $k_2$[N] of each sampling frequency candidate N from one to Nmax (step S107).

After step S105 or S107, the current measuring unit 33 of the processor 23 obtains measurement values of the reactor current measured by the ammeter 6 at intervals of the set sampling period $T_{sample}$, and averages the obtained measurement values of the reactor current, using the sampling frequency $N_{opt}$, to obtain the average current $I_{ave}$ of the reactor in the switching cycle (step S108).

The control unit 34 of the processor 23 performs feedback control of the boost converter 3 so that the difference between the obtained average current $I_{ave}$ of the reactor in the switching cycle and the commanded current value may decrease (step S109). The processor 23 then terminates the process to control the boost converter 3.

As has been described above, the power supply system measures an average of a reactor current flowing through a reactor in a switching cycle of a switching element included in a boost converter. To this end, the power supply system sets a sampling period, at which measurement values of the reactor current are sampled, so as to minimize the sum of differences between the ON period and an integer multiple of the sampling period and between the decreasing period and an integer multiple of the sampling period. In this way, the power supply system reduces the error in a measured average of the reactor current in the switching cycle, regardless of timing when measurement values of the reactor current are sampled, allowing for improving the accuracy of measurement of an average of the reactor current.

The boost converter in the embodiment may be a "magnetic-coupling boost converter." Even in this case, the controller 7 can apply a process similar to that of the embodiment to reactors of respective phases to obtain average currents of the reactors of respective phases in the switching cycle.

According to a modified example, the average current $I_{ave}$ of the reactor in the switching cycle, which is obtained by the current measuring unit 33, may be used for a purpose other than control of the boost converter 3. For example, the processor 23 may use the average current $I_{ave}$ for calculating the electric power supplied from the power source 2. More specifically, the processor 23 can calculate the electric power supplied from the power source 2 by multiplying the voltage outputted from the power source 2 by the average current $I_{ave}$.

As described above, those skilled in the art may make various modifications according to embodiments within the scope of the present invention.

What is claimed is:

1. A power supply system comprising:
a power source that supplies direct-current power;
a DC-DC converter including a reactor connected to the power source and a switching element connected to one end of the reactor, the switching element being repeatedly turned on and off to control a reactor current flowing through the reactor, thereby transforming direct-current power supplied from the power source; and
a control device that controls the DC-DC converter,
the control device comprising a processor configured to:
set a sampling period, at which measurement values of the reactor current measured by an ammeter for measuring the reactor current are sampled, so as to minimize a sum of differences between a length of a first period in a switching cycle of turn-on and turn-off of the switching element and an integer multiple of the sampling period and between a length of a second period in the switching cycle and the integer multiple of the sampling period, the reactor current increasing during the first period and decreasing during the second period,
sample, at intervals of the set sampling period, measurement values of the reactor current measured by the ammeter, and
average measurement values of the reactor current sampled in the switching cycle, thereby measuring an average of the reactor current in the switching cycle; and
wherein the processor calculates, for each of sampling period candidates, a first distance from a product of a sampling frequency in the switching cycle corresponding to the candidate and a duty ratio to an integer closest to the product, determines, of the sampling period candidates, a candidate such that a difference between the length of the first period and an integer multiple of the candidate is the smallest, based on the first distance of each of the sampling period candidates, and sets the determined candidate as the sampling period, the duty ratio being a ratio of a period during which the switching element is ON to the switching cycle.

2. The power supply system according to claim 1, further comprising:
a first voltmeter that measures an input voltage inputted into the DC-DC converter; and
a second voltmeter that measures an output voltage outputted from the DC-DC converter, wherein
the processor is further configured to determine whether operating mode of the DC-DC converter is discontinuous mode in which the reactor current does not flow for some period in the switching cycle or continuous mode in which the reactor current continually flows in the switching cycle, based on the input voltage, the output voltage, and the duty ratio, wherein
when the operating mode of the DC-DC converter is the discontinuous mode, the processor further calculates, for each of the sampling period candidates, a second distance from a product of a sampling frequency in the switching cycle corresponding to the candidate and a ratio of the second period to the switching cycle to an integer closest to the product, determines, of the sampling period candidates, a candidate such that a sum of differences between the length of the first period and an integer multiple of the candidate and between the length of the second period and an integer multiple of the candidate is the smallest, based on the first distance and the second distance of each of the sampling period candidates, and sets the determined candidate as the sampling period.

3. The power supply system according to claim 2, wherein when the operating mode of the DC-DC converter is the continuous mode, the processor calculates a determination value for each of the sampling period candidates and sets, as the sampling period, of the sampling period candidates, a candidate such that the determination value is the smallest, the determination value for each of the sampling period candidates being a product divided by a square of a sampling frequency in the switching cycle corresponding to the candidate, the product being the first distance multiplied by the first distance subtracted from one.

4. The power supply system according to claim 2, wherein when the operating mode of the DC-DC converter is the discontinuous mode, the processor calculates a determination value for each of the sampling period candidates and sets, as the sampling period, of the sampling period candidates, a candidate such that the determination value is the smallest, the determination value for each of the sampling period candidates being a sum of products divided by a square of a sampling frequency in the switching cycle corresponding to the candidate, the products being the first distance multiplied by the first distance subtracted from one and the second distance multiplied by the second distance subtracted from one and by a coefficient depending on a ratio of the output voltage to the input voltage.

5. A control device for controlling a DC-DC converter, the DC-DC converter including a reactor connected to a power source and a switching element connected to one end of the reactor, the switching element being repeatedly turned on and off to control a reactor current flowing through the reactor, thereby transforming direct-current power supplied from the power source,
the control device comprising:
a processor configured to:
set a sampling period, at which measurement values of the reactor current measured by an ammeter for measuring the reactor current are sampled, so as to minimize a sum of differences between a length of a first period in a switching cycle of turn-on and turn-off of the switching element and an integer multiple of the sampling period and between a length of a second period in the switching cycle and the integer multiple of the sampling period, the reactor current increasing during the first period and decreasing during the second period,
sample, at intervals of the set sampling period, measurement values of the reactor current measured by the ammeter, and
average measurement values of the reactor current sampled in the switching cycle, thereby measuring an average of the reactor current in the switching cycle
wherein the processor calculates, for each of sampling period candidates, a first distance from a product of a sampling frequency in the switching cycle corresponding to the candidate and a duty ratio to an integer closest to the product, determines, of the sampling period candidates, a candidate such that a difference between the length of the first period and an integer multiple of the candidate is the smallest, based on the first distance of each of the sampling period candidates, and sets the determined candidate as the sampling period, the duty ratio being a ratio of a period during which the switching element is ON to the switching cycle.

6. A method for measuring a reactor current in a DC-DC converter including a reactor connected to a power source and a switching element connected to one end of the reactor, the switching element being repeatedly turned on and off to control the reactor current flowing through the reactor, thereby transforming direct-current power supplied from the power source, the method comprising:

setting a sampling period, at which measurement values of the reactor current measured by an ammeter for measuring the reactor current are sampled, so as to minimize a sum of differences between a length of a first period in a switching cycle of turn-on and turn-off of the switching element and an integer multiple of the sampling period and between a length of a second period in the switching cycle and the integer multiple of the sampling period, the reactor current increasing during the first period and decreasing during the second period;

sampling, at intervals of the set sampling period, measurement values of the reactor current measured by the ammeter;

averaging measurement values of the reactor current sampled in the switching cycle, thereby measuring an average of the reactor current in the switching cycle calculating, for each of sampling period candidates, a first distance from a product of a sampling frequency in the switching cycle corresponding to the candidate and a duty ratio to an integer closest to the product, determines, of the sampling period candidates, a candidate such that a difference between the length of the first period and an integer multiple of the candidate is the smallest, based on the first distance of each of the sampling period candidates, and sets the determined candidate as the sampling period, the duty ratio being a ratio of a period during which the switching element is ON to the switching cycle.

\* \* \* \* \*